(12) United States Patent
Hulman

(10) Patent No.: US 12,016,815 B2
(45) Date of Patent: Jun. 25, 2024

(54) SIMULATED SHAFT-STIMULATION DEVICE

(71) Applicant: Steve Hulman, Hortonville, WI (US)

(72) Inventor: Steve Hulman, Hortonville, WI (US)

( * ) Notice: Subject to any disclaimer, the term of this patent is extended or adjusted under 35 U.S.C. 154(b) by 155 days.

(21) Appl. No.: 17/071,229

(22) Filed: Oct. 15, 2020

(65) Prior Publication Data

US 2021/0113425 A1 Apr. 22, 2021

Related U.S. Application Data

(60) Provisional application No. 62/924,122, filed on Oct. 21, 2019.

(51) Int. Cl.
| | |
|---|---|
| *A61H 19/00* | (2006.01) |
| *B29C 35/02* | (2006.01) |
| *B29C 39/00* | (2006.01) |
| *B29C 39/26* | (2006.01) |

(52) U.S. Cl.
CPC ............. *A61H 19/32* (2013.01); *B29C 35/02* (2013.01); *B29C 39/003* (2013.01); *B29C 39/26* (2013.01); *B29K 2005/00* (2013.01)

(58) Field of Classification Search
CPC ........ A61H 19/32; B29C 35/02; B29C 39/003
See application file for complete search history.

(56) References Cited

U.S. PATENT DOCUMENTS

| | | | |
|---|---|---|---|
| 5,807,360 A | 9/1998 | Shubin | |
| 7,753,895 B2* | 7/2010 | Matsuura | ............... A61H 19/32 |
| | | | 604/347 |
| 11,813,779 B2* | 11/2023 | Claus | .................. B29C 33/3857 |

* cited by examiner

*Primary Examiner* — James Sanders

(57) ABSTRACT

A product may include a mold assembly comprising a mold inner tube, a mold outer tube, a first end cap, and a second end cap, and an inner texture sleeve; a cured mold product comprising about 20 parts by weight of a dry powder and about 540 parts by weight of water; and at least one sleeve positioned circumferentially around the cured mold product being constructed and arranged to provide constrictive force on the cured mold product.

10 Claims, 15 Drawing Sheets

SIMULATED SHAFT-STIMULATION DEVICE

CROSS-REFERENCE TO RELATED APPLICATIONS

This application claims the benefit of U.S. Provisional Application No. 62/924,122 filed Oct. 21, 2019 and which is incorporated herein by reference.

TECHNICAL FIELD

This invention relates to sexual stimulation devices, and more particularly to a sexual stimulation device that is low cost, with a one-time use component, for enhanced cleanliness and safety.

BACKGROUND

Conventional male sexual stimulation devices intend for a male genital engaging portion to be reused and joined to other device parts. Such devices are primarily used to facilitate human sexual pleasure and are typically designed to somewhat resemble a body orifice and may be mechanized and non-mechanized. In addition, conventional stimulation devices may contain a motor to provide a vibrating function for enhanced stimulation. Even when non-mechanized, such parts are reused with a male genital engaging portion. Such conventional stimulation devices, with their reusable parts, lead to requiring extensive cleaning and disinfecting procedures, if not cleaned properly can be unsafe for use and lead to disease, and even if properly cleaned, over time can develop cracks or other wear marks that make truly getting the device clean after each use impossible. A need exists for a stimulation device, and in particular its parts that engage the male genital, to be disposable after one use. Additionally, there is a need for all parts of the device to be truly separable from any genital engaging portions and then be disposable or easily washable to a level of being near-sterile to substantially sterile. There exists a long felt but unresolved need for a stimulation device including a low cost, disposable, and user made device that overcomes the long-established problems mentioned herein.

SUMMARY OF ILLUSTRATIVE VARIATIONS

A product may include a mold assembly comprising a mold inner tube, a mold outer tube, a first end cap, and a second end cap, and a mold fluid.

A product may include a mold assembly that may include a mold assembly comprising a mold inner tube, a mold outer tube, a first end cap, and a second end cap, and an inner texture sleeve; a cured mold product comprising water and a dry powder comprising an alginate; and at least one sleeve positioned circumferentially around the cured mold product being constructed and arranged to provide constrictive force on the cured mold product.

A method may include providing a mold assembly comprising a mold inner tube, a mold outer tube, a first end cap, and a second end cap, and a mold fluid; assembling the mold inner tube, mold outer tube, and first end cap; preparing a mold fluid by mixing a dry powder and water; and curing the mold fluid to provide a genital sheath.

Other illustrative variations within the scope of the invention will become apparent from the detailed description provided hereinafter. The detailed description and enumerated variations, while disclosing optional variations, are intended for purposes of illustration only and are not intended to limit the scope of the invention.

DESCRIPTION OF THE DRAWINGS AND INVENTION

Select examples of variations within the scope of the invention will become more fully understood from the detailed description and the accompanying drawings, wherein.

The drawings show some but not all variations. The elements depicted in the drawings are illustrative and not necessarily to scale, and the same or similar reference numbers denote the same or similar features throughout the drawings.

DETAILED DESCRIPTION OF ILLUSTRATIVE VARIATIONS

Figure 1:
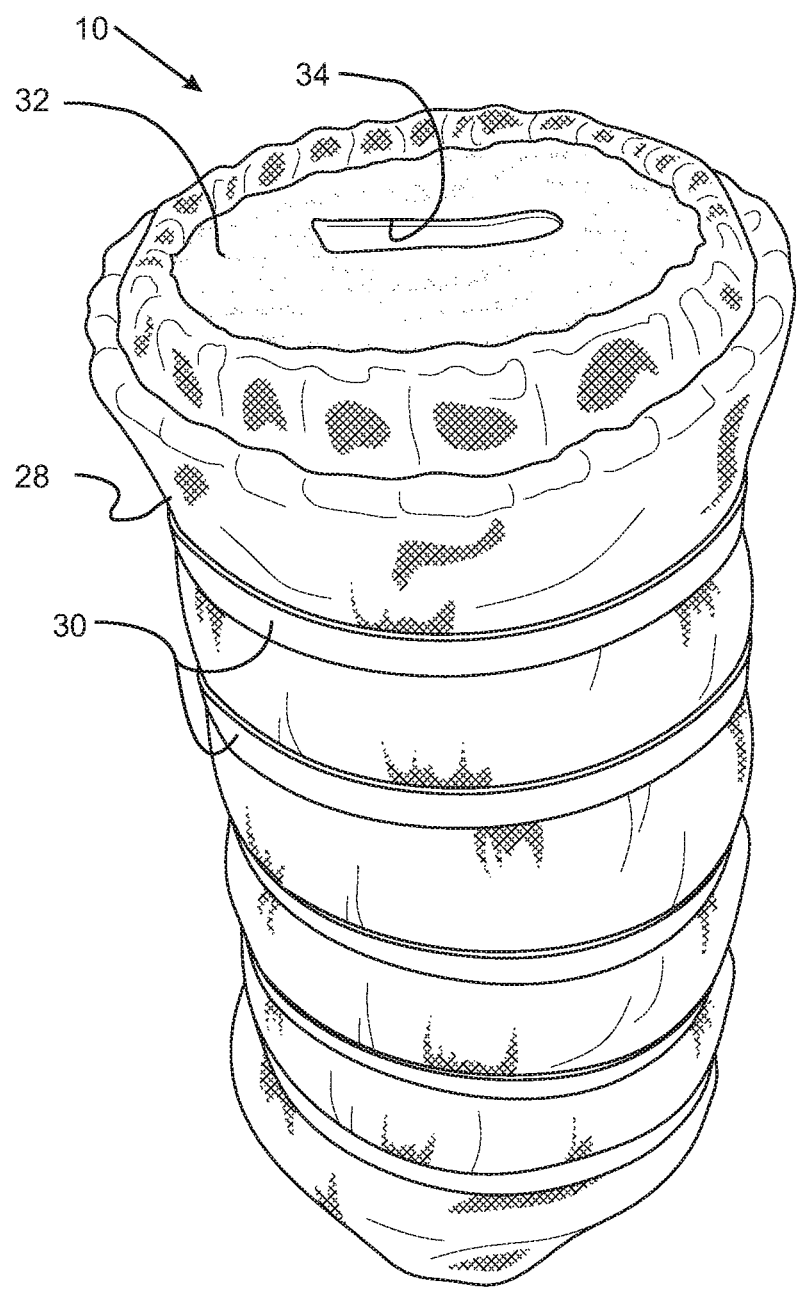
FIG. 1 depicts a perspective view of the simulated genital-stimulation device.

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are within the scope of the invention.

The simulated genital-stimulating device has the following advantages and capabilities. The stimulation device is very discrete and disguised as a life casting kit, making it unlikely to be recognized as a stimulation device. The stimulation device takes minutes to make, only minutes to cure, minutes to clean up, and is quickly ready for use. The stimulation device reusable parts are dishwasher safe and machine washable and formed of material that can be easily cleaned, as well as sterilized if desired. The stimulation device can be used every time desired and reduces exposure to disease or germs that come with reusable genital engaging devices like silicones and TPE that hold germs over time and may become toxic. The stimulation device is adjustable for large, small, soft, hard, and different mold inner tube shapes including an optional inner texture sleeve. The stimulation device includes a dry powder has been used safely over seventy years in the food industry and dentistry, though the process used for the invention is contrary to how this dry powder is used in the common practice.

In use, the stimulation device may be safely warmed and because the genital sheath is primarily water it enables the device to safely hold heat better, without risk of injury to a user. The stimulation device may also be flavored or scented. The stimulation device may be used for purely medical purposes, e.g., collecting sperm samples or other sexual health needs. While the stimulation device is made for single use, that use can last up to 3 hours by the same user before the genital sheath portion may begin to degrade. Stimulation device can be a substitute for users that have sexually transmitted disease and cannot be with a partner safely or cannot have sex with a human partner due to medical reasons, disease, or similar reasons. The stimulation device can provide endurance training for males with premature ejaculation problems.

A genital stimulation device may include a mold assembly including a mold inner tube, a mold outer tube, and a first mold end cap constructed and arranged to engage the mold inner tube and mold outer tube via a tapered fit for ease of assembly and disassembly. According to one variation, the first mold end cap and the mold inner tube may be a single cap and tube assembly. The mold inner tube may be disposed concentrically within the mold outer tube via a tapered fit for ease of assembly and disassembly. In this way, the mold inner tube, mold outer tube, and the first mold end cap may define a generally tubular hollow having an open end exposed to the atmosphere. An inner texture sleeve may be optionally positioned on the molder inner tube or may be mated with a tapered inner tube seat of the first mold end cap. The inner texture sleeve may be constructed and arranged to provide for a diverse texture on the inner surface of a genital stimulation device. The inner texture sleeve may be pre-formed or may be a non-toxic, moldable clay, putty, gel, or the like that is constructed and arranged to allow a user to provide for a diverse texture on the inner surface of a genital stimulation device. The generally tubular hollow may be coated with a mold release agent. A genital sheath may be formed by combining approximately 3% to 10% by weight of a dry powder with 97% to 90% by weight of water to create a mold fluid, which may be preferably shaken to ensure proper mixing has occurred. It is preferable that the water is "soft water" i.e. water that contains low concentrations of ions including calcium and magnesium. The mold fluid may then be poured into the tubular hollow of the mold assembly. The mold fluid may be cured in ambient temperature and pressure for approximately 15 minutes to provide a cured genital stimulation device. A second mold end cap may be seated on the mold assembly opposite the first mold end cap. Such that the tubular hollow and the mold fluid therein is temporarily enclosed. The first end cap and mold inner tube may then be removed separately, or in the case where the first mold end cap and the mold inner tube may be a single cap and tube assembly, may be removed together simultaneously. At least one sleeve covering may be subsequently sleeved over the mold outer tube. The at least one sleeve covering may be any flexible, generally tubular, elastic, or semi-elastic sleeve constructed an arranged to provide constrictive force on the outside of the mold outer tube. The at least one sleeve may be generally tubular having two open ends opposite one another. The at least one sleeve may include a plurality of elastic or rigid spines circumferentially surrounding portions of the at least one sleeve and constructed and arranged to provide additional constrictive force. Once the at least one sleeve covering is sleeved over the mold outer tube, the second mold end and mold outer tube may be removed from the assembly, leaving the cured mold product sleeved within the at least one sleeve to yield a genital stimulation device.

The mold fluid may include primarily water and a dry powder. The dry powder may include alginate. Alginate is a polysaccharide, made up of chains of sugar units that can be thousands of sugars long. Sugars in alginate consist of guluronate (G), mannuronate (M) or guluronate-mannuronate blocks, and the proportion of the different sugars determines how strong a cured mold product may be formed from alginates. Algal polysaccharides may include alginates from brown seaweeds and carrageenan from certain red seaweeds. Dental alginate, essentially the same as prosthetic alginate, has been used hundreds of millions of times in people's mouths by dentists all over the world since their introduction. Industry knowledge suggests that there has never been a verified instance of any allergic reaction to alginate. Neither has there been any verified cases of long-term injury from the use of alginate, even when used daily in a dental office.

The dry powder may include a water-soluble alginate, tetrasodium pyrophosphate, calcium sulfate, and magnesium oxide. The dry powder may include at least one of a water-soluble alginate, tetrasodium pyrophosphate, calcium sulfate, or magnesium oxide. The dry powder may include, by weight, 12 parts water-soluble alginate, 1.5 parts tetrasodium pyrophosphate, 9 parts calcium sulfate, or 4 parts magnesium oxide.

The dry powder may include a water-soluble alginate, tetrasodium pyrophosphate, an alginate dispersing agent, and powdered cellulosic filler. The dry powder may include at least one of a water-soluble alginate, tetrasodium pyrophosphate, an alginate dispersing agent, or powdered cellulosic filler. The dry powder may include, by weight, 14 parts water-soluble alginate, 2 parts tetrasodium pyrophosphate, 12 parts calcium sulfate, 22 parts alginate dispersing agent, or 50 parts powdered cellulosic filler.

The dry powder may include approximately 15% by weight soluble alginates, such as sodium or potassium or triethanolamine alginates; approximately 16% by weight calcium sulphate; approximately 4% by weight zinc oxide; approximately 3% by weight potassium titanium fluoride; approximately 60% by weight diatomaceous earth; approximately 2% by weight sodium phosphate; and trace amounts of coloring or flavoring agents. Non-limiting examples of commercial products that would be suitable for use as the dry powder to be mixed with water to form the of the invention is known as: MAX Print® of MDC Dental (www.mdcdental.com) by Industria del Plastico located in Zapopan, Jal. Mexico; and Alja-Safe™ (Crystalline Silica-Free Alginate) from Smooth-On, Inc. located in Macungie, PA, USA.

The mold fluid may include combining approximately 14 to 30 grams of dry powder and 540 grams of water. The mold fluid may include combining approximately 20 grams of dry powder and 540 grams of water.

The inner texture sleeve may be pre-formed and may be integrated with the mold inner tube. The inner texture sleeve may be a non-toxic, moldable clay, putty, gel, or the like that is constructed and arranged to allow a user to provide for a diverse texture on the inner surface of a genital stimulation device. The non-toxic, moldable clay, putty, gel, or the like may be moisture-resistant and heat-resistant such that when a mold liquid at elevated temperature is poured into the mold assembly, the inner texture sleeve does not lose form, shape, or deteriorate. The inner texture sleeve may be a re-usable, sulfur free, oil and/or wax based sculpting medium constructed and arranged to provide for a diverse texture on the inner surface of the cured mold product of the genital stimulation device.

Figure 2:
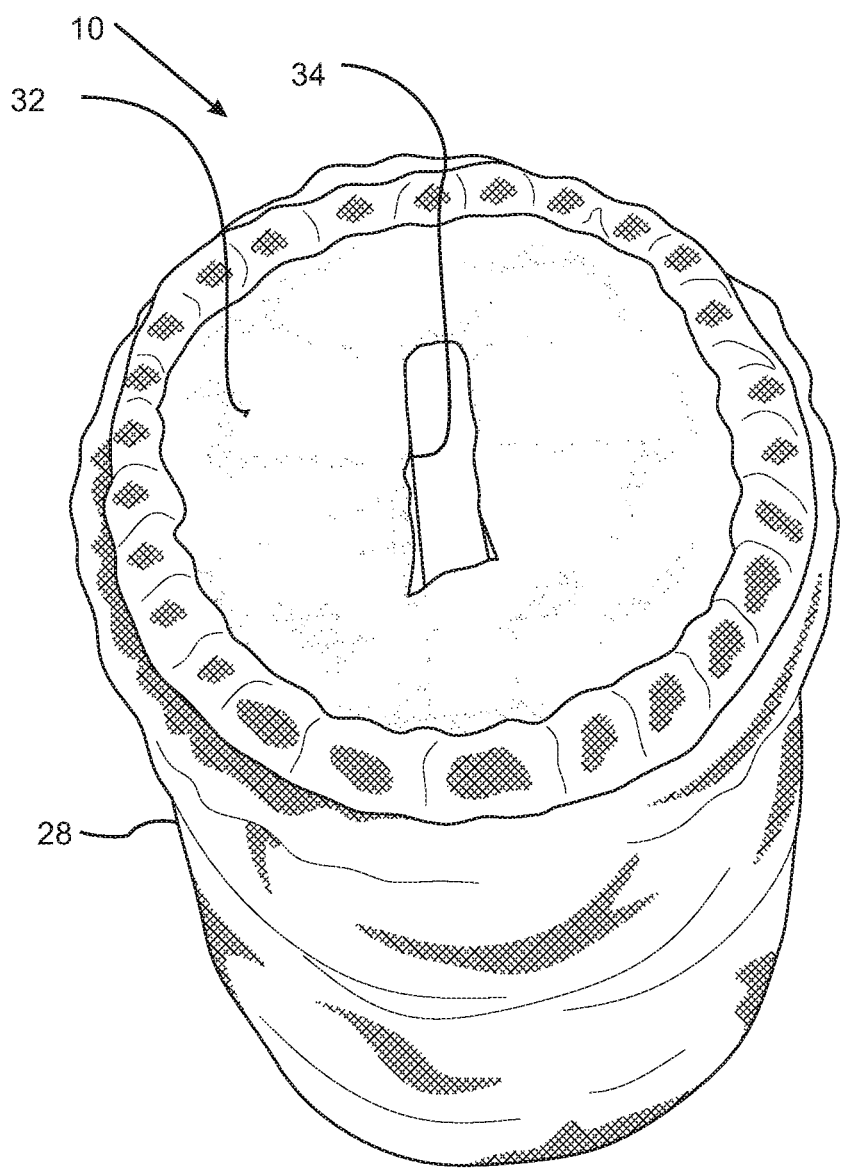
FIG. 2 depicts a perspective view of the simulated genital-stimulation device.
Figure 3:
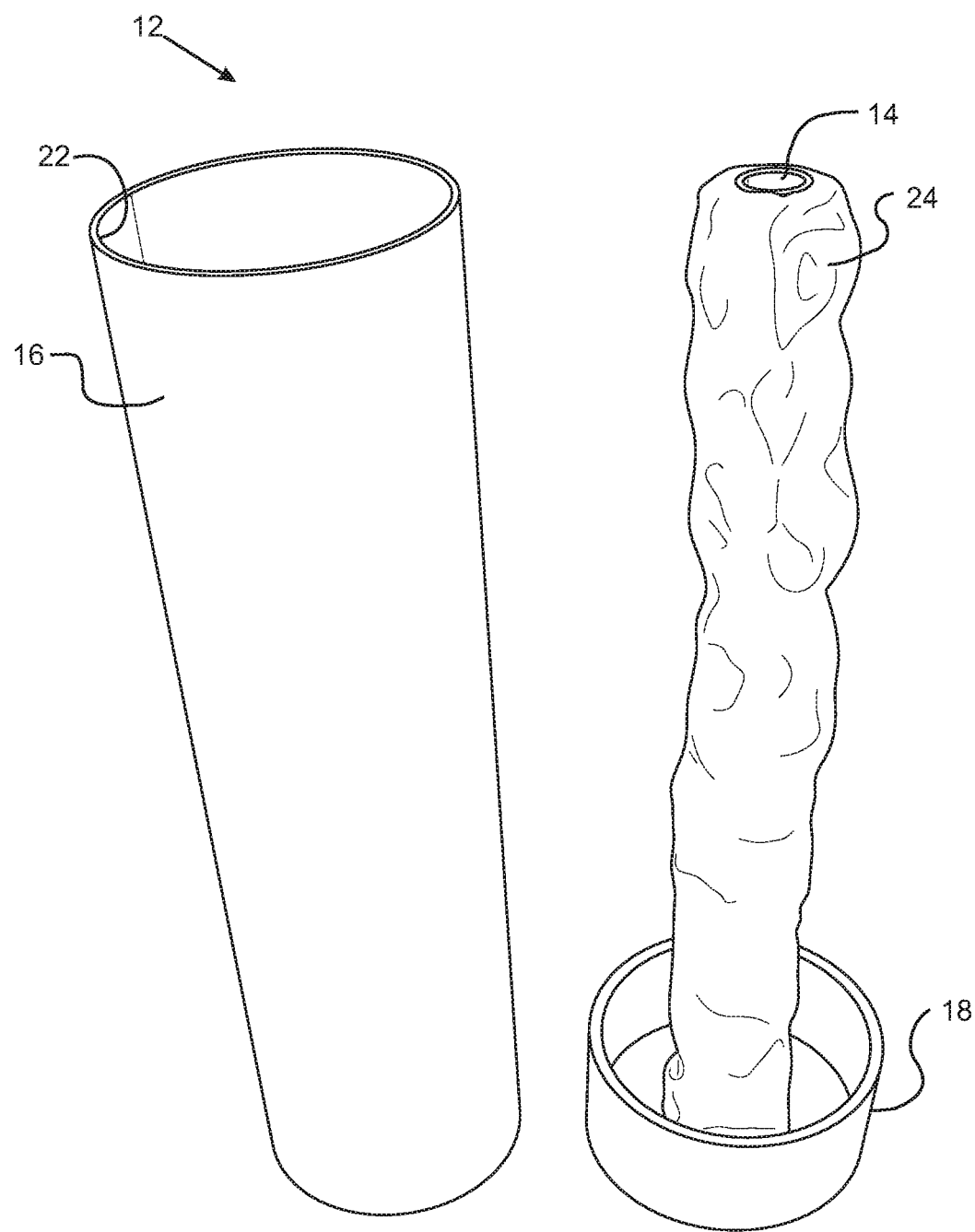
FIG. 3-14 depict portions of a kit for preparing a simulated genital-stimulation device and the various steps of preparation therein.
Figure 4:
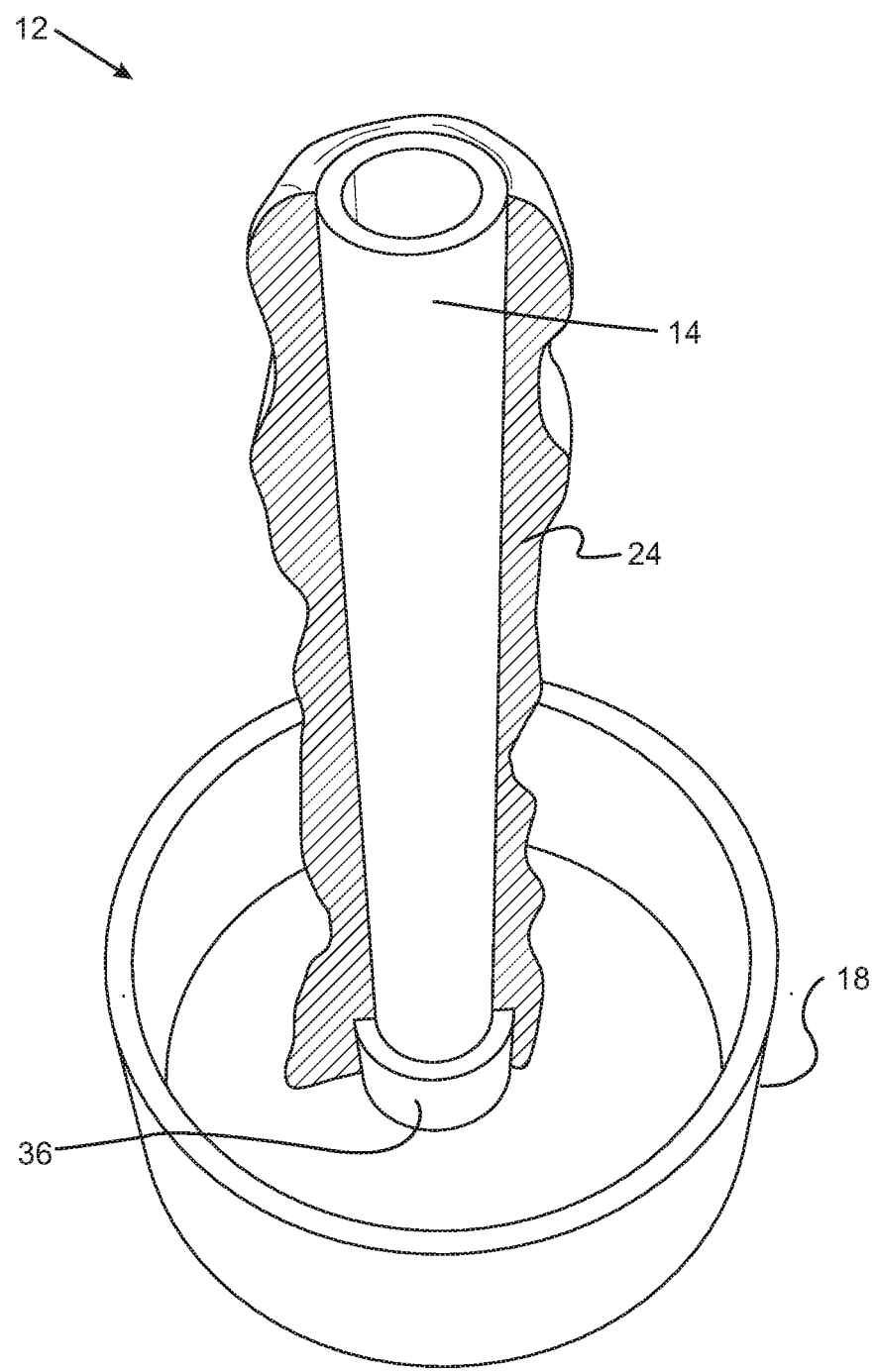
Figure 5:
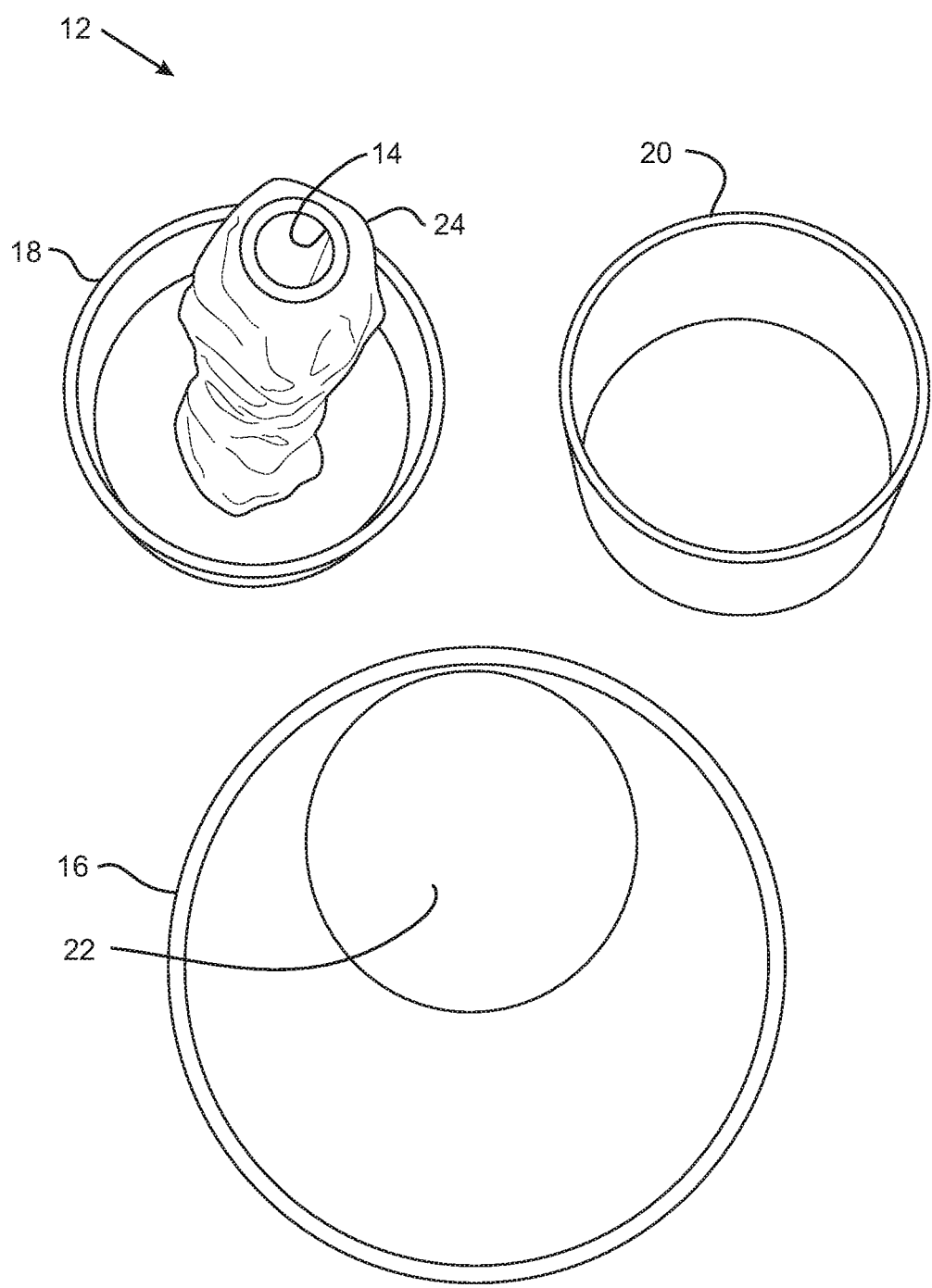
Figure 6:
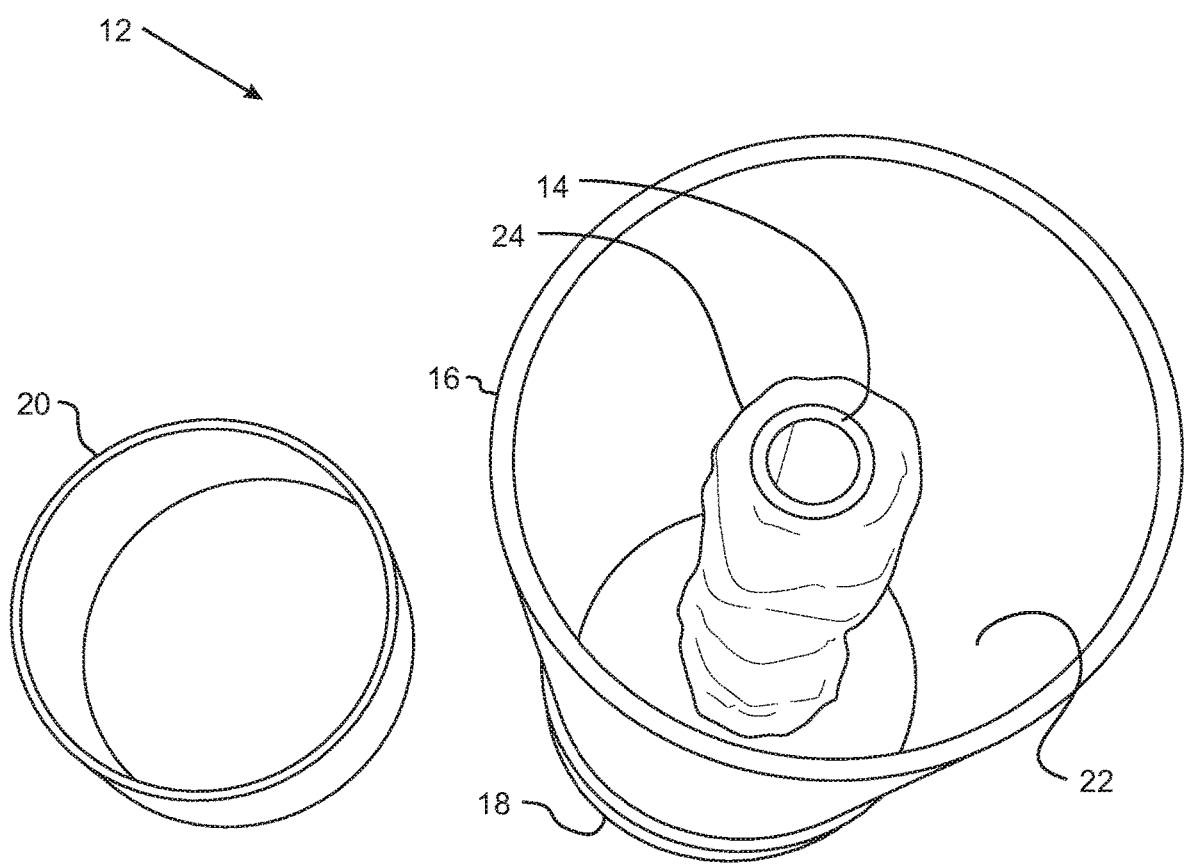
Figure 7:
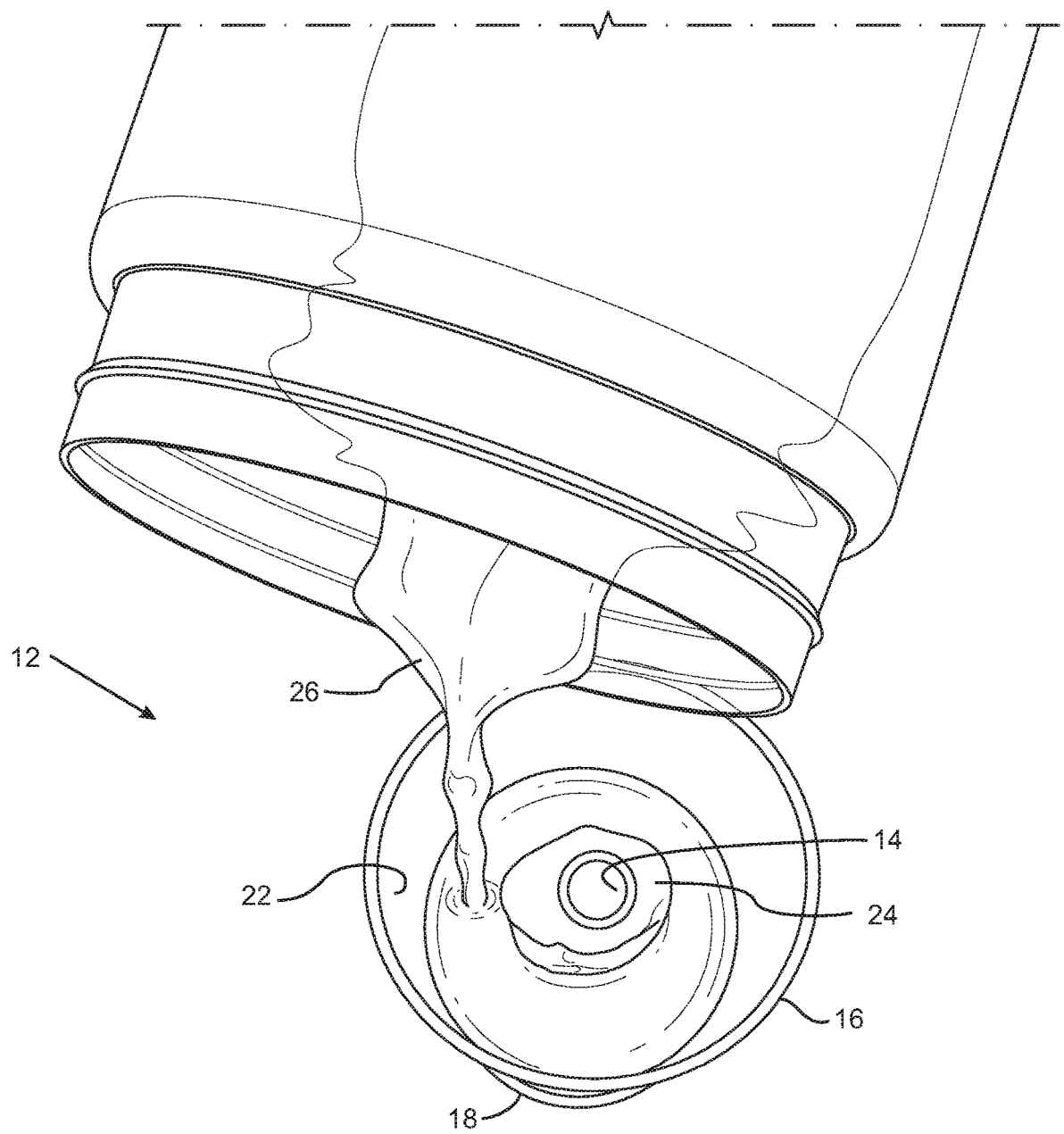
Figure 8:
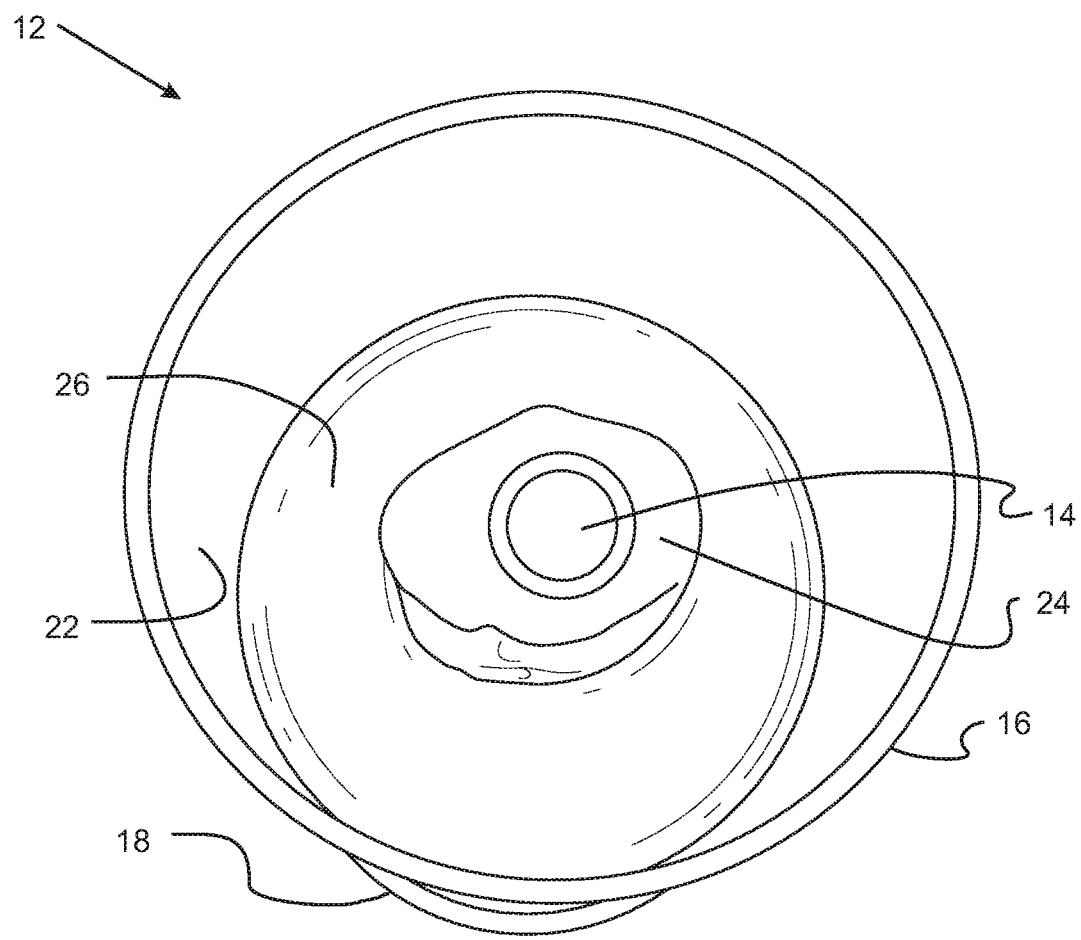

Referring to FIGS. 1 and 2, a genital stimulation device 10 that may include a cured mold product 32 defining a second tubular hollow. The genital stimulation device 10 may further include a sleeve covering 28 that may include at least one spine 30 to provide mild constrictive force on the genital stimulation device 10.

Referring to FIGS. 3 through 6, a mold assembly 12 may include a mold inner tube 14, a mold outer tube 16, a first mold end cap 18, and a second mold end cap 20. The mold inner tube 14 may be mated with an inner tube seat 36 of the first mold end cap 18. The mold outer tube 16 may also be mated with a portion of the first mold end cap 18 such that the mold inner tube 14, mold outer tube 16, and first mole end cap 18 define a generally tubular hollow 22. An inner texture sleeve 24 may be sleeve over at least a portion of the mold inner tube 14.

Referring to FIGS. 7 through 14, a partially assembled mold assembly 12 may include a mold inner tube 14 and mold outer tube 16 seated within the first mold end cap 18. An inner texture sleeve 24 may be positioned on the mold inner tube 14. A mold fluid 16 may be disposed within the generally tubular hollow defined by the mold assembly 12.

Figure 9:
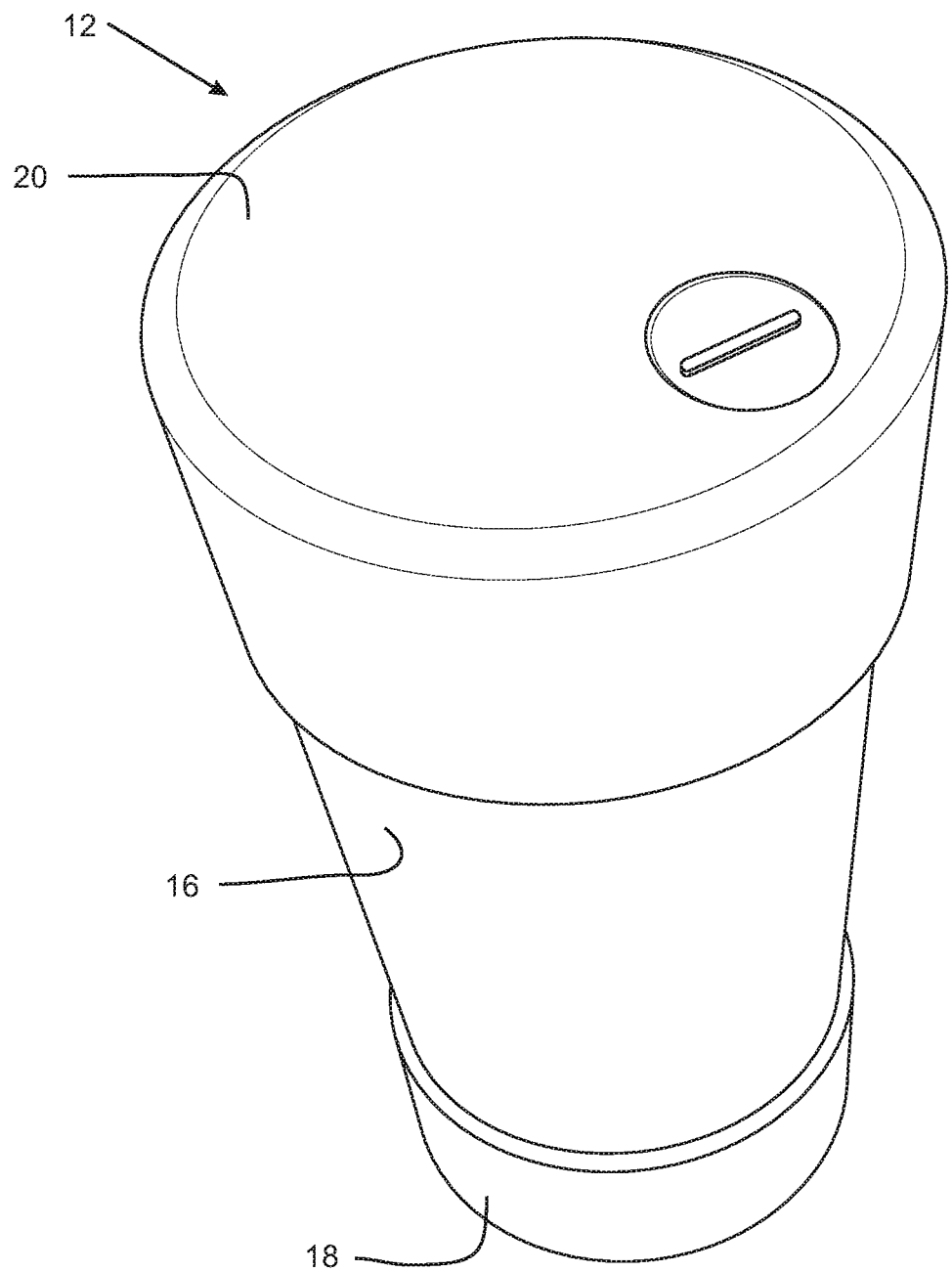

As seen in FIG. 9, a second mold end cap 20 may be disposed over an open end of the mold assembly 12. The mold fluid 16 may be cured to form a cured mold product 32.

Figure 10:
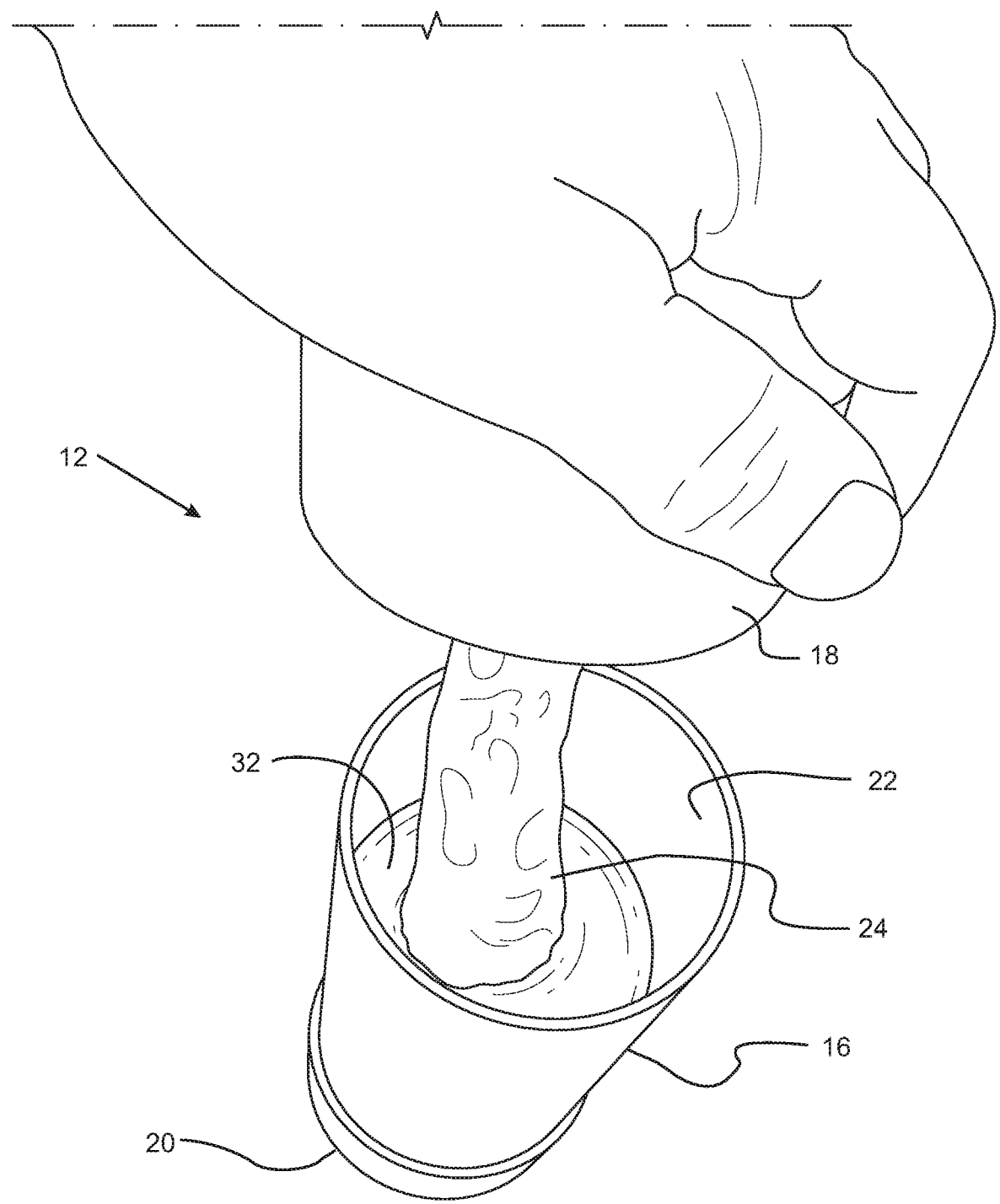
Figure 11:
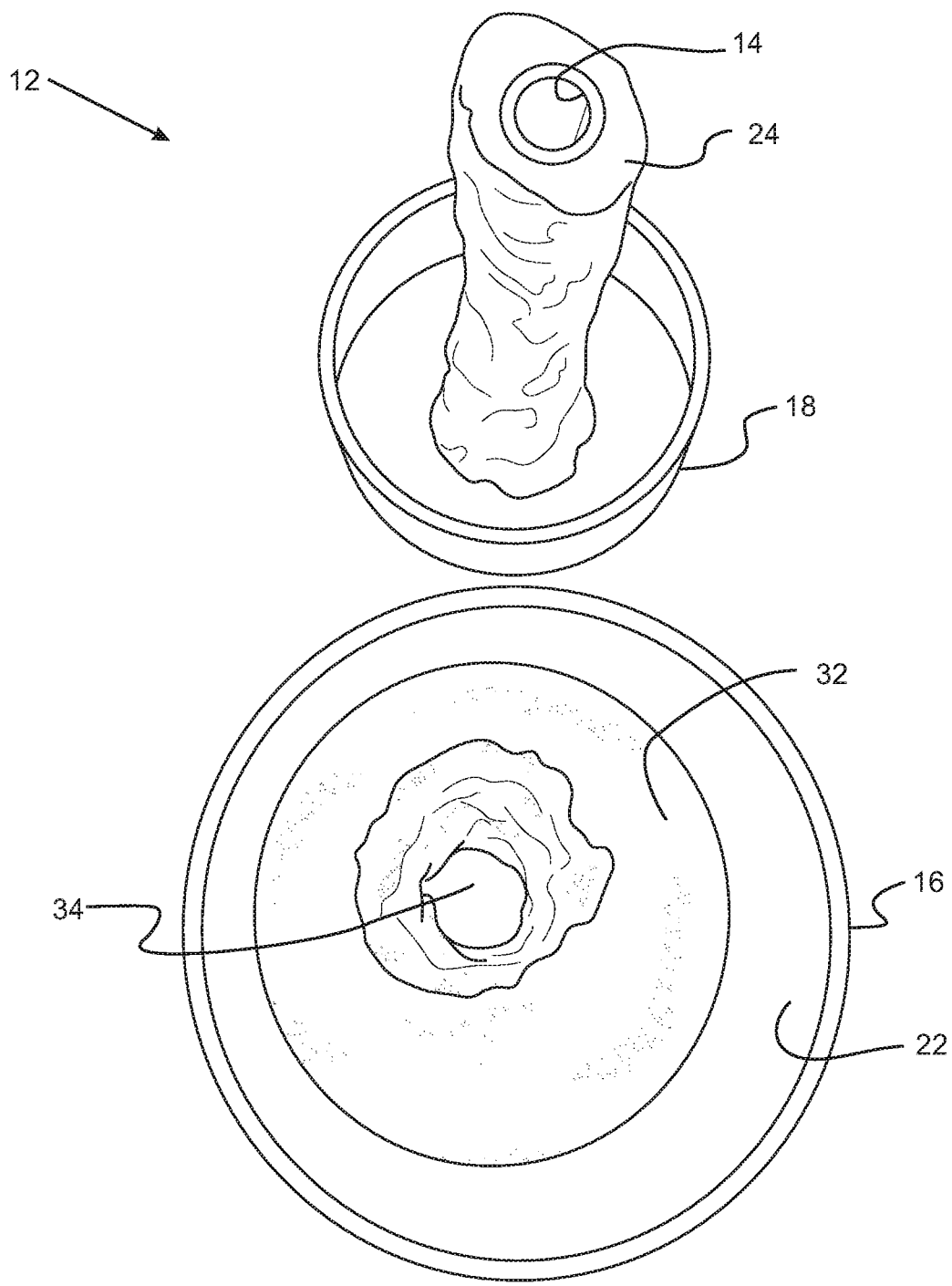

As seen in FIGS. 10 and 11, the first mold end cap 18 may be removed from the mold assembly 12 including the mold inner tube 14 and inner texture sleeve 24 to yield a cured mold product 32 defining a second tubular hollow 34 imprinted with a texture similar to that of the inner texture sleeve 24.

Figure 12:
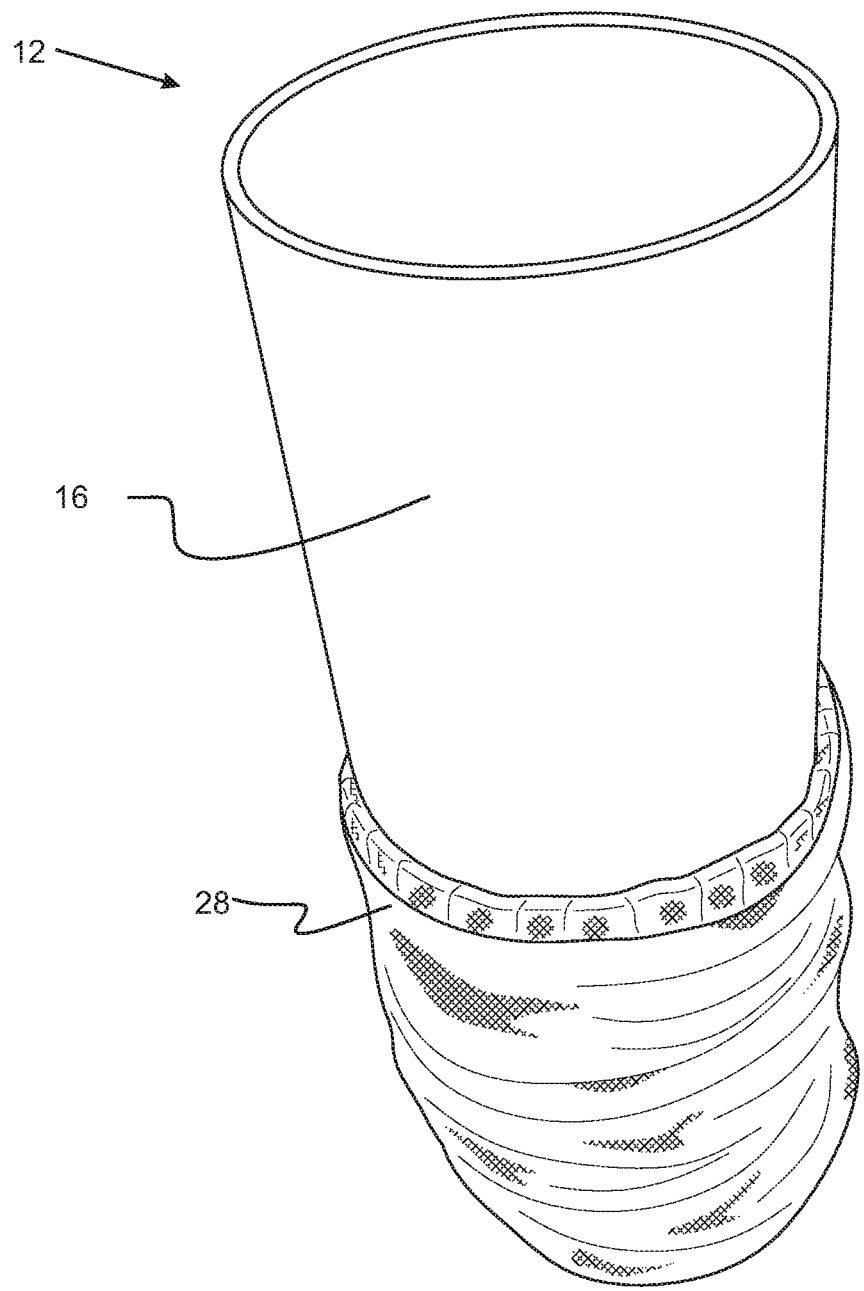
Figure 13:
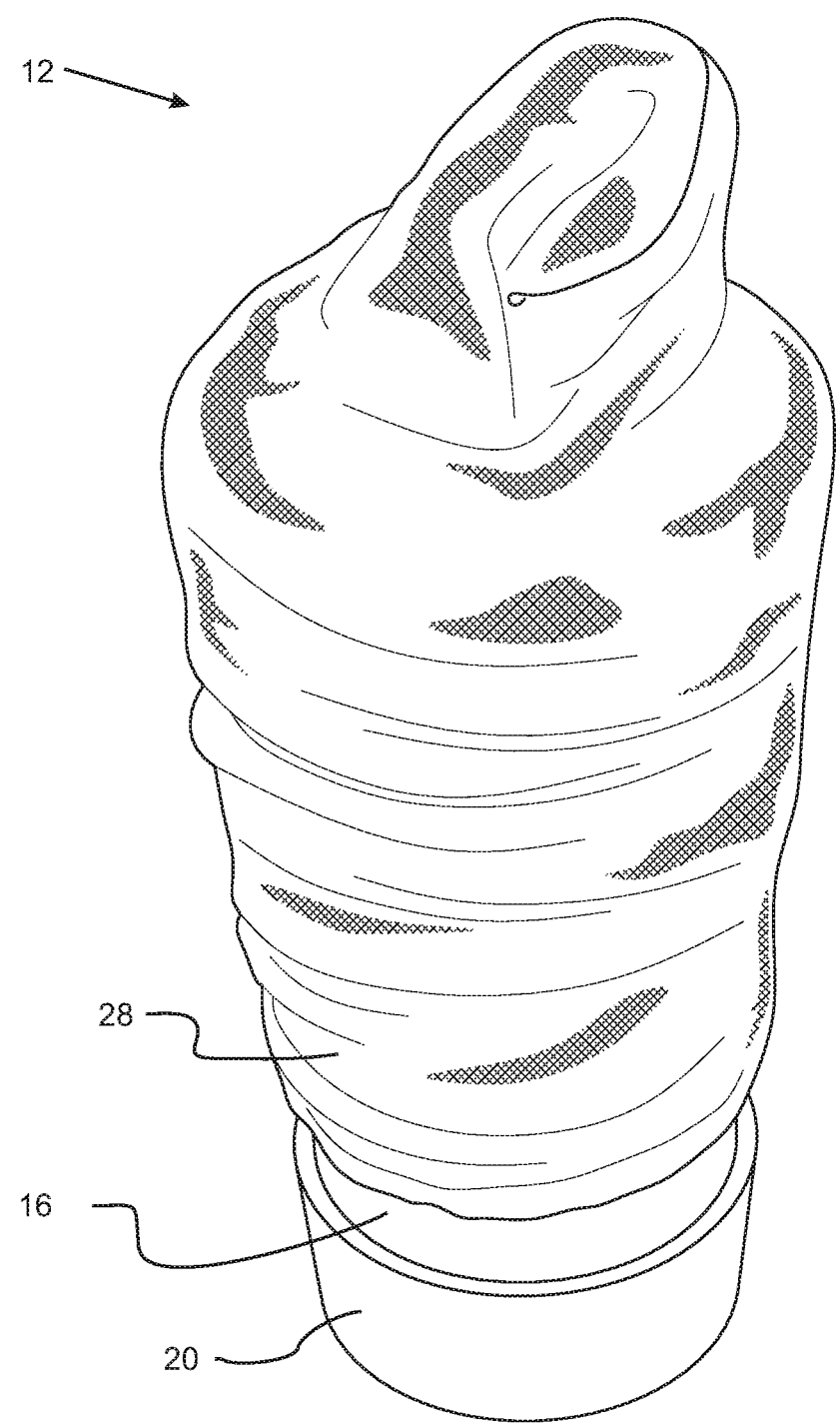
Figure 14:
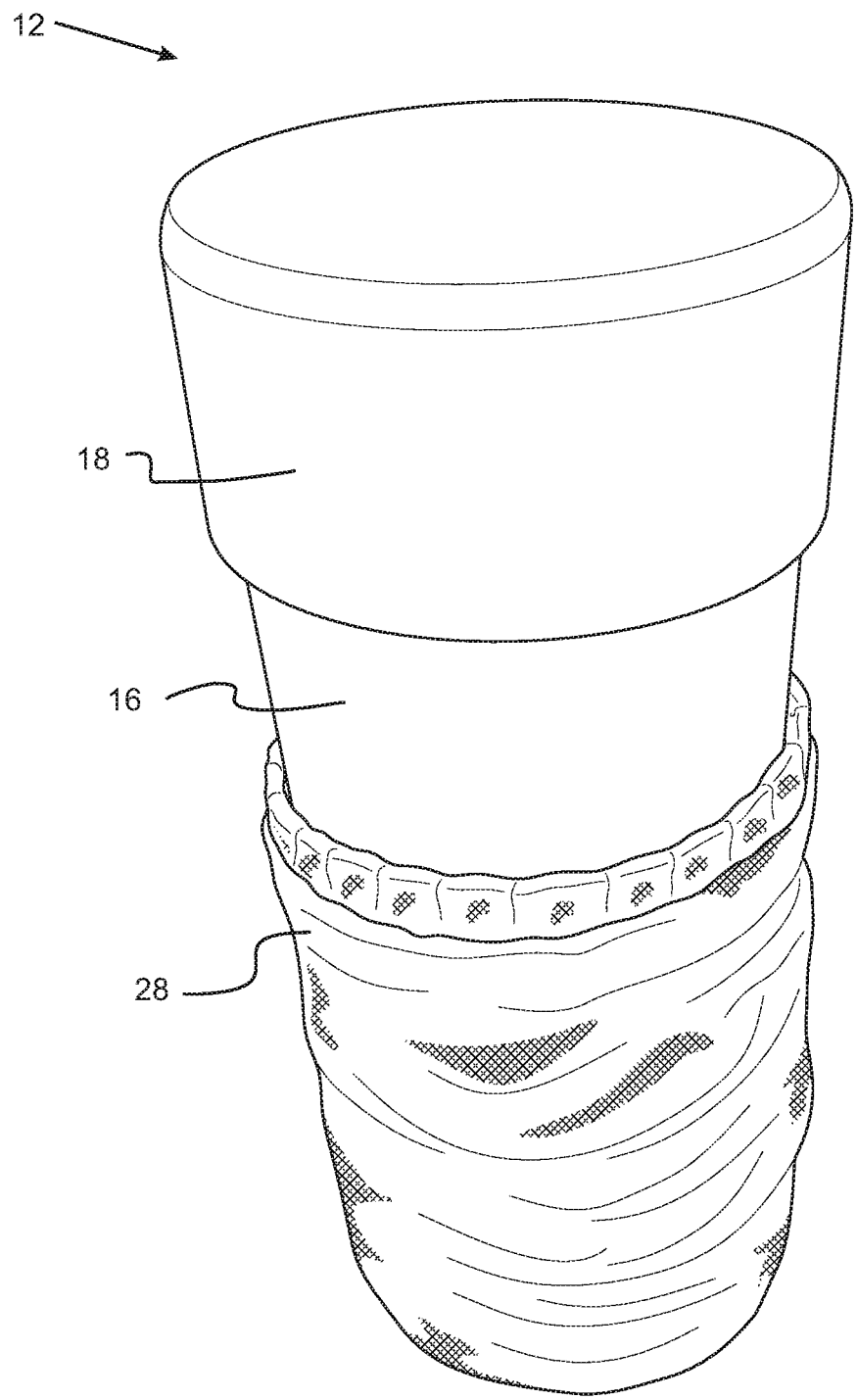

As seen in FIGS. 12 and 13, the sleeve covering 28 may be positioned around the remainder of the mold assembly 12 including the outer mold tube 16 and the second mold end cap 20. The assembly may be inverted and the cured mold product 32 may be removed from the mold assembly 12 and may be positioned within the sleeve covering 28 as best seen in FIGS. 1 and 2.

Figure 15:
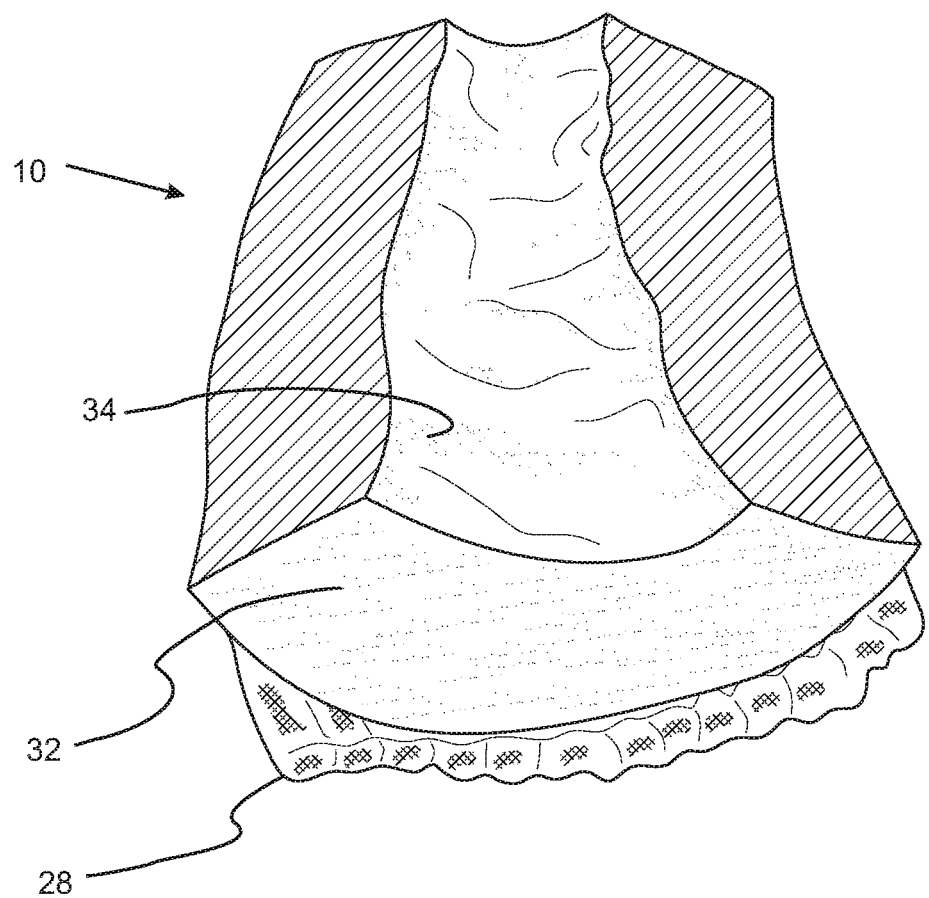
FIG. 15 depicts a partial cross-section of the simulated genital-stimulation device.

Referring to FIG. 15, a cross-sectional view of the genital stimulation device 10 may include a cured mold product 32 defining a second tubular hollow 34 that may have an imprinted texture. The sleeve covering 28 may be disposed around the cured mold product 32. According to variation 1, a product may include a mold assembly comprising a mold inner tube, a mold outer tube, a first end cap, and a second end cap, and a mold fluid.

Variation 2 may include a product as set forth in variation 1 further including a mold fluid comprising a dry powder and water.

Variation 3 may include a product as set forth in any of variations 1 or 2 wherein mold fluid may include about 4 to 30 grams of dry powder and 540 grams of water.

Variation 4 may include a product as set forth in any of variations 1 through 3 wherein mold fluid may include about 20 grams of dry powder and 540 grams of water.

Variation 5 may include a product as set forth in any of variations 1 through 4 wherein the dry powder comprises approximately 15% by weight soluble alginates, approximately 16% by weight calcium sulphate, approximately 4% by weight zinc oxide, approximately 3% by weight potassium titanium fluoride, approximately 60% by weight diatomaceous earth, approximately 2% by weight sodium phosphate, and trace amounts of coloring or flavoring agents.

Variation 6 may include a product as set forth in any of variations 1 through 5 wherein the dry powder may include by weight, at least one of approximately 14 parts water-soluble alginate, 2 parts tetrasodium pyrophosphate, 12 parts calcium sulfate, 22 parts alginate dispersing agent, or 50 parts powdered cellulosic filler.

Variation 7 may include a product as set forth in any of variations 1 through 6 wherein the dry powder may include by weight, at least one of approximately 12 parts water-soluble alginate, 1.5 parts tetrasodium pyrophosphate, 9 parts calcium sulfate, or 4 parts magnesium oxide.

Variation 8 may include a product as set forth in any of variations 1 through 7 wherein the mold inner tube is integrated with the first cap.

Variation 9 may include a product as set forth in any of variations 1 through 8 further comprising at least one sleeve and wherein the sleeve is constrictive.

Variation 10 may include a product as set forth in any of variations 1 through 9 wherein the sleeve may include at least one constrictive band.

Variation 11 may include a product as set forth in any of variations 1 through 10 further comprising an inner texture sleeve.

According to variation 12, a method may include providing a mold assembly comprising a mold inner tube, a mold outer tube, a first end cap, and a second end cap, and a mold fluid; assembling the mold inner tube, mold outer tube, and first end cap; preparing a mold fluid by mixing a dry powder and water; and curing the mold fluid to provide a genital sheath.

Variation 13 may include a method as set forth in variation 12 and may further include providing a second end cap and capping the mold inner tube and mold outer tube to encapsulate the mold fluid prior to curing the mold fluid.

Variation 14 may include a method as set forth in variations 12 through 13 and may further include positioning the at least one sleeve over the mold outer tube.

Variation 15 may include a method as set forth in variations 12 through 14 and may further include removing at least one the first end cap, second end cap, or mold outer tube such that the genital sheath may be sleeved within the at least one sleeve.

Variation 16 may include a method as set forth in variations 12 through 15 wherein the mold fluid may include about 4 to 30 grams of dry powder and 540 grams of water.

Variation 17 may include a method as set forth in variations 12 through 16 wherein the dry powder may include approximately 15% by weight soluble alginates, approximately 16% by weight calcium sulphate, approximately 4% by weight zinc oxide, approximately 3% by weight potassium titanium fluoride, approximately 60% by weight diatomaceous earth, approximately 2% by weight sodium phosphate, and trace amounts of coloring or flavoring agents.

Variation 18 may include a method as set forth in variations 12 through 17 wherein the dry powder may include by weight, at least one of approximately 14 parts water-soluble alginate, 2 parts tetrasodium pyrophosphate, 12 parts calcium sulfate, 22 parts alginate dispersing agent, or 50 parts powdered cellulosic filler Variation 19 may include a method as set forth in variations 12 through 18 wherein the dry powder may include by weight, at least one of approximately 12 parts water-soluble alginate, 1.5 parts tetrasodium pyrophosphate, 9 parts calcium sulfate, or 4 parts magnesium oxide.

According to variation 20, a product may include a mold assembly that may include a mold assembly comprising a mold inner tube, a mold outer tube, a first end cap, and a second end cap, and an inner texture sleeve; a cured mold product comprising water and a dry powder comprising an alginate; and at least one sleeve positioned circumferentially around the cured mold product being constructed and arranged to provide constrictive force on the cured mold product.

The present invention includes the description, examples, variations, and drawings disclosed; but it is not limited to such description, examples, variations, or drawings. As briefly described above, the reader should assume that features of one disclosed variation can also be applied to all other disclosed variations, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other variations will be apparent to a person of ordinary skill in the packaging arts, and all such modifications and other variations are intended and deemed to be within the scope of the present invention.

What is claimed is:

1. A product comprising:
   a mold assembly comprising a mold inner tube, a mold outer tube, a first end cap, and a second end cap, and a mold fluid, the mold assembly being constructed and arranged to produce a genital stimulation device comprising a cured mold product; and
   at least one sleeve and wherein the sleeve is constrictive and comprises at least one constrictive band.

2. A product as set forth in claim 1, further comprising a mold fluid comprising a dry powder and water.

3. A product as set forth in claim 2, wherein mold fluid comprises about 4 to 30 grams of dry powder and 540 grams of water.

4. A product as set forth in claim 3, wherein mold fluid comprises about 20 grams of dry powder and 540 grams of water.

5. A product as set forth in claim 3, wherein the dry powder comprises approximately 15% by weight soluble alginates, approximately 16% by weight calcium sulphate, approximately 4% by weight zinc oxide, approximately 3% by weight potassium titanium fluoride, approximately 6% by weight diatomaceous earth, approximately 2% by weight sodium phosphate, and trace amounts of coloring or flavoring agents.

6. A product as set forth in claim 3, wherein the dry powder comprises by weight, at least one of approximately 14 parts water-soluble alginate, 2 parts tetrasodium pyrophosphate, 12 parts calcium sulfate, 22 parts alginate dispersing agent, or 50 parts powdered cellulosic filler.

7. A product as set forth in claim 3, wherein the dry powder comprises by weight, at least one of approximately 12 parts water-soluble alginate, 1.5 parts tetrasodium pyrophosphate, 9 parts calcium sulfate, or 4 parts magnesium oxide.

8. A product as set forth in claim 1, wherein the mold inner tube is integrated with the first cap.

9. A product as set forth in claim 1, further comprising an inner texture sleeve.

10. A product as set forth in claim 3, wherein the dry powder comprises approximately 15% by weight soluble alginates, approximately 16% by weight calcium sulphate, approximately 4% by weight zinc oxide, approximately 3% by weight potassium titanium fluoride, approximately 60% by weight diatomaceous earth, approximately 2% by weight sodium phosphate, and trace amounts of at least one of coloring, scent, or flavoring agents.

* * * * *